United States Patent [19]

Krashkevich et al.

[11] Patent Number: 5,446,007
[45] Date of Patent: Aug. 29, 1995

[54] BROWN CONTRAST ENHANCEMENT GLASS

[75] Inventors: David G. Krashkevich, Dallas; Sally Pucilowski, Luzerne, both of Pa.

[73] Assignee: Schott Glass Technologies, Inc., Duryea, Pa.

[21] Appl. No.: 240,418

[22] Filed: May 10, 1994

[51] Int. Cl.$^6$ .................... C03C 3/085; C03C 3/091; C03C 3/095

[52] U.S. Cl. .................... 501/64; 501/66; 501/67; 501/69

[58] Field of Search ............ 501/64, 66, 67, 69, 501/71; 351/163

[56] References Cited

U.S. PATENT DOCUMENTS

| | | | |
|---|---|---|---|
| 1,449,793 | 3/1923 | Taylor | 501/61 |
| 2,688,560 | 9/1954 | Armistead | 501/65 |
| 2,688,561 | 9/1954 | Armistead | 501/65 |
| 3,294,556 | 12/1966 | Harrington | 501/67 |
| 3,457,182 | 7/1969 | Lee, Jr. et al. | 252/301.4 R |
| 3,495,964 | 2/1970 | Hares et al. | 65/30.1 |
| 3,640,890 | 2/1972 | Lee, Jr. et al. | 252/301.4 F |
| 3,672,919 | 6/1972 | Sack | 501/59 |
| 3,960,754 | 6/1976 | Woodcock | 501/124 |
| 4,093,468 | 6/1978 | Boitel et al. | 501/4 |
| 4,257,811 | 3/1981 | Jahn | 501/64 |
| 4,288,250 | 9/1981 | Yamashita | 501/64 |
| 4,376,829 | 3/1983 | Daiku | 501/64 |
| 4,390,637 | 6/1993 | Daiku | 501/64 |
| 4,405,881 | 9/1983 | Kobayashi | 313/480 |
| 4,521,524 | 6/1985 | Yamashita | 501/64 |
| 4,769,347 | 9/1988 | Cook et al. | 501/64 |
| 5,039,631 | 8/1991 | Krashkevich et al. | 501/64 |
| 5,061,659 | 10/1991 | Ciolek et al. | 501/64 |
| 5,077,240 | 12/1991 | Hayden et al. | 501/67 |
| 5,190,896 | 3/1993 | Pucilowski et al. | 501/64 |
| 5,242,869 | 9/1993 | Tarumi et al. | 501/56 |
| 5,256,607 | 10/1993 | Kerko et al. | 501/65 |
| 5,268,335 | 12/1993 | Kerko et al. | 501/66 |

FOREIGN PATENT DOCUMENTS

| | | | |
|---|---|---|---|
| 0072911 | 6/1975 | Japan | 501/67 |
| 0734152 | 5/1980 | U.S.S.R. | 501/64 |
| WO93/02019 | 2/1993 | WIPO . | |

OTHER PUBLICATIONS

ANSI® Z80.3-1986 (Revision of ANSI Z80.3-1977), "American National Standard for Ophthalmics—Nonprescription Sunglasses and Fashion Eyewear—Requirements" (1986), pp. 7–22.

Primary Examiner—Mark L. Bell
Assistant Examiner—David Sample
Attorney, Agent, or Firm—Millen, White, Zelano & Branigan

[57] ABSTRACT

A brown chemstrengthenable contrast enhancement, UV attenuated glass (e.g., for sunglasses) comprises, in weight percent,

| Oxide | Wt. % |
|---|---|
| $SiO_2$ | 40–72 |
| $B_2O_3$ | 0–13 |
| $Al_2O_3$ | 0.5–3 |
| $Li_2O$ | 0–3 |
| $Na_2O$ | 8–15 |
| $K_2O$ | 1–10 |
| $TiO_2$ | 4.2–10.2 |
| $CeO_2$ | 0.5–3.5 |
| $Nd_2O_3$ | 5.0–16.5 |
| $Fe_2O_3$ | 2.5–4.0 |
| CoO | 0.00–0.02 |
| NiO | 0.06–0.33 |
| ZnO | 0.0–7.0 |
| $Er_2O_3$ | 0–2 |
| $Cr_2O_3$ | 0.0–0.2 |
| $V_2O_5$ | 0.0–0.2 |
| CuO | 0.00–0.10 |
| $MnO_2$ | 0.0–2.0 |
| having the following properties: | |
| % $T_{v,c}$ (1.8 mm) | 14–30 |
| a | −0.1 to +6.0 |
| b | +18.0 to +26.0 |
| % T (380 nm; 1.8 mm) | 0.0 |
| % T (400 nm; 1.8 mm) | ≦1.5 | meeting the $D_{6500}$ (1.8 mm) and Traffic Signal (1.8 mm) specifications of ANSI Z80.3-1986, and wherein the amount of $Fe^{+2}$ in the glass is selected sufficiently low that said "a" and Traffic Signal properties are achieved.

25 Claims, No Drawings

BROWN CONTRAST ENHANCEMENT GLASS

BACKGROUND OF THE INVENTION

This invention relates to an improved contrast enhancement glass useful for ophthalmic applications such as sunglass lenses, and having desirable and/or necessary properties related to appearance, compatibility with visibility and sight discrimination requirements such as for traffic signal transmittance, etc.

Thus, it is desired for many applications to enhance the contrast of target subjects with respect to background radiation. In addition, it is often desired to lower the amount of UV radiation transmitted through a given glass, e.g., for sunglasses, preferably to obtain 0% transmission up to a wavelength of 380 nm and in some cases, e.g., where UV radiation is especially harmful, up to and/or around 400 nm. While it has been possible to obtain either of these effects alone and, to a certain extent, both effects together, there still remains room for improvement, especially in glasses which are brown, especially while simultaneously meeting stringent requirements such as for traffic light transmittance. Of course, it is also desirable that, for ophthalmic and/or optical applications, the glass be capable of providing severe lens corrections (high index) and have a low density.

It is known that $Nd_2O_3$ can provide contrast enhancement due to its natural combination of absorption bands in the visible region. See, e.g., U.S. Pat. Nos. 4,769,347, 4,288,250, 4,521,524, 4,376,829, 4,405,881 and 4,390,637. In contrast enhancement glasses containing Nd, it is also desired that the radiation coming from a desired subject maintain the true color of the latter on passage through the glass and that the image of the subject be sharp. With such properties, the glass would be most useful plano or in prescription lenses.

Neodymium has also been added to various glasses for other purposes. See, e.g., U.S. Pat. Nos. 1,449,793 (coloring), 2,688,560 (coloring), 3,457,182 (lasing), 3,640,890 (lasing) and 4,093,468 (coloring of glassceramics). In addition, it is known to add colorants such as $CeO_2$, $Sm_2O_3$, $Fe_2O_3$, CoO, NiO, CuO, $Er_2O_3$, $MnO_2$, $V_2O_5$, $Cr_2O_3$, etc., for purposes of obtaining desired colors in silicate glasses, in various combinations. $CeO_2$ is also well known as a solarization inhibitor. See, e.g., U.S. Pat. Nos. 4,257,811, 3,495,964, 3,672,919 and 3,960,754, as well as many of the patents mentioned above. The ability of some of these colorants, as well as $TiO_2$, to absorb short wavelength radiation is also known in general. See, e.g., U.S. Pat. No. 4,521,524.

Some of the aforementioned problems have been solved for grey glasses in U.S. Pat. No. 5,190,896, which also reports initial failed attempts at solving such problems for brown glasses. See its Examples J, K and 22. As noted at column 5, line 56 to column 6, line 10, as well as in view of the properties listed for these three examples in columns 7 and 8, while a brown color was achieved, simultaneous achievement of desirable and/or necessary properties was not achieved.

SUMMARY OF THE INVENTION

This invention solves the problems noted above with respect to brown glasses providing both pleasing appearance and color and desirable and/or necessary performance properties, especially with respect to values of a, b, $T_{v,c}$, $D_{6500}(x,y)$, % T and traffic signal transmittance, all as defined below.

This invention thus in one aspect relates to a glass composition achieving the characteristics described above, comprising in weight percent (batch basis),

| Oxide | Wt. % |
| --- | --- |
| $SiO_2$ | 40–72 |
| $B_2O_3$ | 0–13 |
| $Al_2O_3$ | 0.5–3 |
| $Li_2O$ | 0–3 |
| $Na_2O$ | 8–15 |
| $K_2O$ | 1–10 |
| $TiO_2$ | 4.2–10.2 |
| $CeO_2$ | 0.5–3.5 |
| $Nd_2O_3$ | 5.0–16.5 |
| $Fe_2O_3$ | 2.5–4.0 |
| CoO | 0.00–0.02 |
| NiO | 0.06–0.33 |
| ZnO | 0.0–7.0 |
| $Er_2O_3$ | 0–2 |
| $Cr_2O_3$ | 0.0–0.2 |
| $V_2O_5$ | 0.0–0.2 |
| CuO | 0.00–0.10 |
| $MnO_2$ | 0.0–2.0 |
| having the following properties: | |
| % $T_{v,c}$ (1.8 mm) | 14–30 |
| a | −0.1 to +6.0 |
| b | +18.0 to +26.0 |
| % T (380 nm; 1.8 mm) | 0.0 |
| % T (400 nm; 1.8 mm) | ≦1.5 | meeting the $D_{6500}$ (1.8 mm) and Traffic Signal (1.8 mm) specifications of ANSI Z80.3-1986 (which is hereby incorporated by reference in its entirety), and wherein the amount of $Fe^{+2}$ in the glass is selected sufficiently low that said properties are achieved, especially the "a" and $D_{6500}$ chromaticity values.

Typically, such amount of $Fe^{+2}$ will be less than about 4.5% of the amount of iron in the glass, preferably 3, 2 or 1%, or even lower, where the percent value is as defined in Example 28 herein.

Preferred aspects are those wherein the glass composition is:

| | Wt. % |
| --- | --- |
| Oxide | |
| $SiO_2$ | 45–65 |
| $B_2O_3$ | 0.5–5 |
| $Al_2O_3$ | 0.5–2.5 |
| $Li_2O$ | 0.0–2.7 |
| $Na_2O$ | 8.5–15.0 |
| $K_2O$ | 1.0–8.5 |
| $TiO_2$ | 5.2–9.2 |
| $CeO_2$ | 1–3 |
| $Nd_2O_3$ | 5.0–14 |
| $Fe_2O_3$ | 2.6–3.7 |
| CoO | 0.00–0.017 |
| NiO | 0.10–0.25 |
| ZnO | 0.0–6.5 |
| $Er_2O_3$ | 0.0–1.0 |
| $Cr_2O_3$ | 0.00–0.17 |
| $V_2O_5$ | 0.00–0.17 |
| CuO | 0.00–0.08 |
| $MnO_2$ | 0.0–1.8 |
| most preferably: | |
| $SiO_2$ | 48–60 |
| $B_2O_3$ | 0.5–2.5 |
| $Al_2O_3$ | 0.5–1.5 |
| $Li_2O$ | 0.0–2.4 |
| $Na_2O$ | 9–15 |
| $K_2O$ | 1.0–7.5 |
| $TiO_2$ | 6–9 |
| $CeO_2$ | 1.5–2.8 |

-continued

|  | Wt. % |
|---|---|
| Nd$_2$O$_3$ | 5.0–13.0 |
| Fe$_2$O$_3$ | 2.7–3.6 |
| CoO | 0.000–0.015 |
| NiO | 0.11–0.24 |
| ZnO | 0.0–6.0 |
| Er$_2$O$_3$ | 0.0–0.5 |
| Cr$_2$O$_3$ | 0.00–0.15 |
| V$_2$O$_5$ | 0.00–0.15 |
| CuO | 0.00–0.07 |
| MnO$_2$ | 0.0–1.4 |
| and the properties are: | |
| % T$_{v,c}$ (1.8 mm) | 14–25 |
| a | −0.1 to +5.5 |
| b | +18.5 to +25.5 |
| most preferably: | |
| % T$_{v,c}$ (1.8 mm) | 15–24 |
| a | −0.1 to +4.5 |
| b | +19.0 to +25.0 |

The foregoing aspects of this invention involve maintaining the amount of Fe$^{+2}$ in the glass at low levels such that the desired properties are achieved especially with respect to chromaticity values, e.g., a, b, D$_{6500}$, Traffic Signal, etc. This can be achieved by ensuring that no reducing conditions and/or agents are present during glass melting, such as H$_2$, carbon, etc. Preferably, the glass can be melted under at least slightly oxidizing conditions, e.g., using nitrates as metal compound batch ingredients or using any other oxidizing method. See, e.g., "Colour Generation and Control in Glass", *Glass Science and Technology*, 2, C. R. Bamford Elsevier Scientific Publishing Co., N.Y. (1977), pp. 77–87. In many cases it will be sufficient merely to ensure no reducing conditions are present.

The discovery of the importance of Fe$^{+2}$ content solves the problems encountered in the attempts of U.S. Pat. No. 5,190,896 to provide desirable brown glasses. Thus, in one aspect of the invention, it has been discovered by the current inventors that Example 22 of U.S. Pat. No. 5,190,896 contained about 7% of Fe$^{+2}$ on the basis defined in Example 28 and thus failed to meet chromaticity specifications. By selection of proper Fe$^{+2}$ contents as defined above, this aspect of the invention correspondingly solves the prior art problem. See Examples A–C, 1 and 2 below.

In another aspect, this invention relates to a glass composition also achieving the characteristics described above, comprising in weight percent (batch bases),

| Oxide | Wt. % |
|---|---|
| SiO$_2$ | 40–72 |
| B$_2$O$_3$ | 0–13 |
| Al$_2$O$_3$ | 0.5–3 |
| Li$_2$O | 0–3 |
| Na$_2$O | 8–15 |
| K$_2$O | 1–10 |
| TiO$_2$ | 4.2–10.2 |
| CeO$_2$ | 0.5–3.5 |
| Nd$_2$O$_3$ | 5.0–16.5 |
| Fe$_2$O$_3$ | 2.5–4.0 |
| CoO | 0.0053–0.02 |
| NiO | 0.06–0.33 |
| ZnO | 0.0–7.0 |
| Er$_2$O$_3$ | 0–2 |
| Cr$_2$O$_3$ | 0.0–0.2 |
| V$_2$O$_5$ | 0.0–0.2 |
| CuO | 0.00–0.10 |
| MnO$_2$ | 0.0–2.0 |
| having the following properties | |

-continued

|  |  |
|---|---|
| % T$_{v,c}$ (1.8 mm) | 14–30 |
| a | −0.1 to +6.0 |
| b | +18.0 to +26.0 |
| % T (380 nm; 1.8 mm) | 0.0 |
| % T (400 nm; 1.8 mm) | ≦1.5 | meeting the D$_{6500}$ (1.8 mm) and Traffic Signal (1.8 mm) specifications of ANSI Z80.3-1986.

These glasses solve the mentioned prior art problems of U.S. Pat. No. 5,190,896 in a different manner, by using a mandatory cobalt content to maintain chromaticity characteristics, e.g., thereby causing the oxide composition per se of Example 22 of U.S. Pat. No. 5,190,896 to achieve the desired chromaticity of this invention. See Examples A and 3 below. Once a cobalt content has been included in the glass of this invention, further cobalt additions are expected to have less dramatic effects. It is also desirable for these cobalt-containing glasses to keep Fe$^{+2}$ at lower levels as discussed above.

In other preferred aspects, the glass composition is:

| Oxide | Wt. % |
|---|---|
| SiO$_2$ | 45–65 |
| B$_2$O$_3$ | 0.5–5 |
| Al$_2$O$_3$ | 0.5–2.5 |
| Li$_2$O | 0.0–2.7 |
| Na$_2$O | 8.5–15.0 |
| K$_2$O | 1.0–8.5 |
| TiO$_2$ | 5.2–9.2 |
| CeO$_2$ | 1–3 |
| Nd$_2$O$_3$ | 5.0–14 |
| Fe$_2$O$_3$ | 2.6–3.7 |
| CoO | 0.0053–0.017 |
| NiO | 0.10–0.25 |
| ZnO | 0.0–6.5 |
| Er$_2$O$_3$ | 0.0–1.0 |
| Cr$_2$O$_3$ | 0.00–0.17 |
| V$_2$O$_5$ | 0.00–0.17 |
| CuO | 0.00–0.08 |
| MnO$_2$ | 0.0–1.8 |
| most preferably: | |
| SiO$_2$ | 48–60 |
| B$_2$O$_3$ | 0.5–2.5 |
| Al$_2$O$_3$ | 0.5–1.5 |
| Li$_2$O | 0.0–2.4 |
| Na$_2$O | 9–15 |
| K$_2$O | 1.0–7.5 |
| TiO$_2$ | 6–9 |
| CeO$_2$ | 1.5–2.8 |
| Nd$_2$O$_3$ | 5.0–13.0 |
| Fe$_2$O$_3$ | 2.7–3.6 |
| CoO | 0.0053–0.015 |
| NiO | 0.11–0.24 |
| ZnO | 0.0–6.0 |
| Er$_2$O$_3$ | 0.0–0.5 |
| Cr$_2$O$_3$ | 0.00–0.15 |
| V$_2$O$_5$ | 0.00–0.15 |
| CuO | 0.00–0.07 |
| MnO$_2$ | 0.0–1.4 |
| and the properties are: | |
| % T$_{v,c}$ (1.8 mm) | 14–25 |
| a | −0.1 to +5.5 |
| b | +18.5 to +25.5 |
| most preferably: | |
| % T$_{v,c}$ (1.8 mm) | 15–24 |
| a | −0.1 to +4.5 |
| b | +19.0 to +25.0 |

In yet another aspect of this invention, the amount of Fe$_2$O$_3$ in the glasses is at least 2.8 wt. %, despite the trends shown in U.S. Pat. No. 5,190,896 which imply that for brown glasses, achievement of chromaticity properties such as those required for this invention require lower $Fe_2O_3$ contents.

A further advantage of this invention is the high $n_e$(green mercury line, 546 nm) and low density of the glasses. These properties are especially important for prescription lenses.

Furthermore, in addition to the components listed above, it is possible to include in the glasses of this invention conventional RO's such as CaO, MgO and ZnO in small amounts, e.g., 0–2 wt. %, preferably 0–1 wt. % or 0–0.5 wt. %; most preferably there are essentially no alkaline earth metal oxides. When included, these components improve the chemical durability of the glass but hinder its chemstrengthenability, except generally for ZnO. Small amounts of these ingredients effect large differences in glass color. $ZrO_2$ can also be included in the same amounts. At higher levels, adverse effects on color properties occur.

With respect to UV attenuation, it is also possible to employ conventional UV attenuation surface coatings to the glass to reduce its overall UV attenuation where desired. However, a major advantage of the glasses of this invention, where desired, is that they are UV attenuated to a high degree without coatings. The nature of such coatings and methods of applying them or other coatings such as mirror coatings are conventional. See, "Coatings on Glass," *Thin Films Science and Technology*, 6, H. K. Pulker Elsevier Science Publishing Co. Inc., New York, N.Y.

If the amounts of $TiO_2$, $CeO_2$ or $Fe_2O_3$ are higher or lower than the prescribed compositional tolerances, then undesired UV attenuation, transmission and/or color space will be achieved. If the amount of $Fe_2O_3$ exceeds tolerance, chromaticity and transmission requirements are not attained. If the concentration is less than minimum, chromaticity degrades. If the $CeO_2$ concentration is greater than prescribed, then desired chromaticity for $D_{6500}$ is not achieved. If the concentration input is less than minimum, chromaticity and transmission will not be achieved. If the amount of $TiO_2$ is greater than prescribed, color coordinate specification is adversely affected. If the amount of $TiO_2$ is less than prescribed, then 400 nm attenuation and chromaticity requirements are not achieved.

$Nd_2O_3$ is the primary contrast enhancement component. Amounts under 5.0 wt. % can deleteriously affect contrast enhancement and amounts over 16.5 wt. % are superfluous for contrast enhancement purposes.

$La_2O_3$ can be substituted on an ion for ion basis for $Nd_2O_3$ in the glasses of this invention. Thus, for any given $Nd_2O_3$-containing glass of this invention, any amount of $Nd_2O_3$ over the stated minimum amount of 5.0 wt. % can be replaced by $La_2O_3$ where less $Nd_2O_3$ is satisfactory, thus keeping the rare earth level constant in the composition.

$SiO_2$, of course, is a primary network former. $B_2O_3$ is employed to aid in melting. Since the glass is preferably tank produced, too high a $B_2O_3$ content can lead to inordinate dissolution of the tank refractory material, causing deleterious inclusion problems and severe tank wear.

$Al_2O_3$ is contained for the increased durability it provides the glass. If too much $Al_2O_3$ is included, difficulties in melting ensue. The alkali metal oxides enhance meltability of the glass. The amount of $Na_2O$ is increased with respect to those of $Li_2O$ and $K_2O$ in order to enhance chemstrengthenability. Too high amounts of $K_2O$ would deleteriously affect this property. In addition, too high a $Li_2O$ content could produce unacceptable bulk glass crystallization.

The colorants for a preferred brown glass are CoO and NiO as described above. Other colorants such as $Cr_2O_3$, $V_2O_5$, $MnO_2$ and CuO are optional as described above. The colorant $Er_2O_3$ may be added to improve contrast enhancement due to its select absorption in certain visible spectral ranges.

Each component of the glasses of this invention can be varied within its prescribed range, the latter being alternatively definable by narrower subsumed ranges, e.g., wherein one or both range endpoints vary from the endpoints mentioned above by increments of 0.01, 0.1, 0.5, etc. Surprisingly, all these components in the prescribed amounts enable ready achievement of desired UV properties and desired chromaticity and transmittance without more than routine experimentation using conventional testing for determination of whether properties are as desired. The amounts and combinations may be varied to achieve a precisely desired hue.

The glasses of this invention can be chemstrengthened or air hardened using very well known procedures. They can be employed (e.g., shaped, ground and polished) as sunglass lenses similarly fully conventionally by standard mounting in suitable eyeglass frames.

The color properties referred to herein are defined fully conventionally using Hunter coordinates a (or $a_L$) and b (or $b_L$) which are related to the conventional CIE system in a known fashion (see Color Science by Guenther Wyszecki and W. S. Stiles, C. 1967 CIE and chromaticity coordinates, page 279, and L, a and b, page 460, inter alia). The a and b coordinates have been selected, among other things, by aesthetic considerations.

The luminous transmittance as per ANSI Z80.3-1986, page 8, is a function of the spectral transmittance of the lens weighted by the corresponding coordinates of the photopic luminous efficiency distribution of the CIE (1931) standard colorimetric observer and by the spectral intensity of standard illuminant C. Herein, this transmittance will be designated $T_{v,c}$.

The luminous transmittance ($\tau_v$) (equivalent to $T_{v,c}$ notation) of a lens is expressed mathematically as follows:

$$\tau_V = \frac{\int_{380}^{780} \tau(\lambda) V(\lambda) S_C(\lambda) \, d\lambda}{\int_{380}^{780} V(\lambda) S_C(\lambda) \, d\lambda}$$

Where:

$\tau(\lambda)$ = Spectral transmittance of the lens $V(\lambda)$ = Spectral ordinate of the photopic luminous efficiency distribution $[\bar{y}(\lambda)]$ of the CIE (1931) standard colorimetric observer $S_C(\lambda)$ = Spectral intensity of standard illuminant C.

The luminous transmittance specified above falls within the requirements of American National Standard for ophthalmic, non-prescription sunglasses and fashion eyewear for General Purpose Sunglass applications (see ANSI specification Z80.3-1986, page 15).

In addition to luminous transmission, traffic signal recognition is an important criterion which must be met in order to comply with ANSI Z80.3-1986 general purpose sunglass applications (refer to ANSI Z80.3-1986, page 15 and FIG. 1, page 16).

The transmittance properties related to traffic signal recognition may be described as follows:

Chromaticity Coordinates. The x and y chromaticity coordinates of traffic signals and average daylight (D65), as viewed through the lens, are expressed mathematically as follows:

$$x = \frac{X}{X+Y+Z}$$

$$y = \frac{Y}{X+Y+Z}.$$

The values of X, Y and Z are determined as follows:
(1) For traffic signals as viewed through the lens, $$X_{sig} = \int_{380}^{780} \tau(\lambda) S_A(\lambda) \tau_{sig}(\lambda) \bar{x}(\lambda) \, d\lambda$$

$$Y_{sig} = \int_{380}^{780} \tau(\lambda) S_A(\lambda) \tau_{sig}(\lambda) \bar{y}(\lambda) \, d\lambda$$

$$Z_{sig} = \int_{380}^{780} \tau(\lambda) S_A(\lambda) \tau_{sig}(\lambda) \bar{z}(\lambda) \, d\lambda$$

(2) For average daylight (D65) as viewed through the lens, $$X_{D65} = \int_{380}^{780} \tau(\lambda) S_{D65}(\lambda) \bar{x}(\lambda) \, d\lambda$$

$$Y_{D65} = \int_{380}^{780} \tau(\lambda) S_{D65}(\lambda) \bar{y}(\lambda) \, d\lambda$$

$$Z_{D65} = \int_{380}^{780} \tau(\lambda) S_{D65}(\lambda) \bar{z}(\lambda) \, d\lambda$$

Where:

$\tau(\lambda)$ = Spectral transmittance of the lens $S_A(\lambda)$ = Spectral intensity of standard illuminant $A$ $S_{D65}(\lambda)$ = Spectral intensity of standard illuminant $D65$ $\tau_{sig}(\tau)$ = Spectral transmittance of the traffic signal filter (red, yellow or green)

$\bar{x}(\lambda), \bar{y}(\lambda), \bar{z}(\lambda)$ = CIE (1931) standard observer (2°) spectral tristimulus values of the equal-energy spectrum $X, Y, Z$ = Tristimulus values.

Traffic Signal Transmittance. Traffic signal transmittance is a function of the spectral transmittance of the lens weighted by the corresponding ordinates of the photopic luminous efficiency distribution of the CIE (1931) standard observer, the spectral intensity of standard illuminant A, and the spectral transmittance of the appropriate traffic signal filter (red, yellow and green).

The traffic signal transmittance ($\tau_{sig}$) of a lens is expressed mathematically as follows:

$$\tau_{sig} = \frac{\int_{380}^{780} \tau(\lambda) V(\lambda) S_A(\lambda) \tau_{sig}(\lambda) \, d\lambda}{\int_{380}^{780} V(\lambda) S_A(\lambda) \tau_{sig}(\lambda) \, d\lambda}$$

$$= \frac{Y_{sig}}{\int_{380}^{780} V(\lambda) S_A(\lambda) \tau_{sig}(\lambda) \, d\lambda}$$

Where: $\tau(\lambda)$, $S_A(\lambda)$, $\tau_{sig}(\lambda)$, $Y_{sig}$ are defined in Setion 3.9.3.1 ANSI Z80.3, 1986

$V(\lambda)$ = Spectral ordinate of the photopic luminous efficiency distribution $[\bar{y}(\lambda)]$ of the CIE (1931) standard observer.

Computation data for transmittance properties are given in Table 1 of ANSI Z80.3-1986. (The appropriate reference data for Table 1 are given in Table 2 of ANSI Z80.3-1986).

Whether a given glass meets the $D_{6500}$ and Traffic Signal specifications of ANSI Z80.3-1986 can routinely be determined by comparing the relevant x, y and (equivalent to $\tau_{sig}$) values, measured in accordance with the mentioned ANSI specification, with the specifications given in the ANSI specification.

When the glasses of this invention are employed as contrast enhancement eyeglass lenses, e.g., for sunglasses, they are preferably shaped conventionally into a suitable form for use and conventionally combined with typical eyeglass frames. If the glasses are employed as contrast enhancement filters for other applications, similar processing will be employed in conjunction with the desired shapes.

The glass of this invention can be provided in any desirable shape using conventional molding procedures well known in the glass industry. In view of the combination of ingredients given above, the glasses of this invention can be very well chemstrengthened using conventional techniques such as those mentioned in Stroud, *Glass Technology*, Vol. 29, No. 3, June 1988, 108–114. Typically, a crown-bath solution can be used, e.g., 99.5% KNO$_3$ (by weight) and 0.5% silicic acid (by weight), at a temperature in the range of about 420°–480° C. for an exchange time of, e.g., 16 hours. Typically, a preferred exchange temperature will be approximately 25° lower than the strain point of the glass. The determination of optimum chemstrengthening layer thicknesses can be effected routinely. Typically, acceptable thicknesses of a chemstrengthened layer will be above 20 μm, preferably about 50 μm; however, narrower and larger thicknesses are fully included. Typical surface compression values achievable for these glasses are about (1700–2000) nm/cm (birefringence).

The glasses of this invention can be prepared routinely by using normal batch components corresponding to the above-mentioned compositions, followed by conventional melting in an appropriate crucible, e.g., a platinum or ceramic crucible, e.g., at melt temperatures of, for example, 1300°–1450° C.

An example of typical properties of a glass of this invention are:

| Physical Properties | |
|---|---|
| Density (gm/cm$^3$) | 2.85 |
| CTE × 10$^{-7}$°C.$^{-1}$ (20-300° C.) | 93 |

-continued

| | |
|---|---|
| Tg (°C.) | 503 |
| T$_{soft}$ (°C.) | 650 |
| Optical Properties | |
| n$_e$ | 1.603 |
| ν$_e$ | 41.6 |
| U.V. Transmission Characteristics | |
| % T @ 400 nm (1.8 mm) | 0.3 |
| % T @ 380 nm (1.8 mm) | 0.0 |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications cited above and below, are hereby incorporated by reference.

| | | Examples (All 1.8 mm thickness) | | | | | |
|---|---|---|---|---|---|---|---|
| Oxide or Property | | A[a] | B[b] | C[b] | 1[c] | 2[c] | 3[d] |
| SiO$_2$ | | 55.57 | 55.57 | 55.57 | 55.57 | 55.57 | 55.57 |
| B$_2$O$_3$ | | 1.44 | 1.44 | 1.44 | 1.44 | 1.44 | 1.44 |
| Al$_2$O$_3$ | | 1.24 | 1.24 | 1.24 | 1.24 | 1.24 | 1.24 |
| Li$_2$O | | 2.35 | 2.35 | 2.35 | 2.35 | 2.35 | 2.35 |
| Na$_2$O | | 9.37 | 9.37 | 9.37 | 9.37 | 9.37 | 9.37 |
| K$_2$O | | 2.35 | 2.35 | 2.35 | 2.35 | 2.35 | 2.35 |
| TiO$_2$ | | 8.19 | 8.19 | 8.19 | 8.19 | 8.19 | 8.19 |
| La$_2$O$_3$ | | 0.00 | 0.00 | 0.00 | 0.00 | 0.00 | 0.00 |
| Nd$_2$O$_3$ | | 11.60 | 11.60 | 11.60 | 11.60 | 11.60 | 11.60 |
| CeO$_2$ | | 2.73 | 2.73 | 2.73 | 2.73 | 2.73 | 2.73 |
| Fe$_2$O$_3$ | | 2.63 | 2.63 | 2.63 | 2.63 | 2.63 | 2.63 |
| CoO | | 0.00 | 0.00 | 0.00 | 0.00 | 0.00 | 0.0106 |
| NiO | | 0.249 | 0.249 | 0.249 | 0.249 | 0.249 | 0.249 |
| KHF$_2$ | | 1.88 | 1.88 | 1.88 | 1.88 | 1.88 | 1.88 |
| NH$_4$Cl | | 0.40 | 0.40 | 0.40 | 0.40 | 0.40 | 0.40 |
| % T$_{v,c}$ | | 19.5 | 2.6 | 18.0 | 22.9 | 22.8 | 19.4 |
| a | | 6.90 | 15.05 | 8.13 | 6.03 | 6.00 | 3.24 |
| b | | 24.66 | 11.02 | 24.07 | 25.13 | 25.01 | 22.30 |
| % T @ 400 nm | | 0.2 | 0.0 | 0.1 | 0.3 | 0.3 | 0.3 |
| 380 nm | | 0.0 | 0.0 | 9.0 | 0.0 | 0.0 | 0.0 |
| D$_{6500}$ | | | | | | | |
| x | | 0.4615 | 0.5937 | 0.4688 | 0.4470 | 0.4466 | 0.4342 |
| y | | 0.4389 | 0.3973 | 0.4375 | 0.4322 | 0.4318 | 0.4321 |
| Traffic Signal | | | | | | | |
| Red | T$_{sig}$ | 50.9 | 11.4 | 49.1 | 58.6 | 58.4 | 47.4 |
| Yellow | T$_{sig}$ | 24.3 | 4.3 | 22.8 | 27.8 | 27.7 | 23.0 |
| | x | 0.6246 | 0.6575 | 0.6256 | 0.6221 | 0.6221 | 0.6178 |
| | y | 0.3743 | 0.3419 | 0.3734 | 0.3768 | 0.3768 | 0.3811 |
| Green | T$_{sig}$ | 17.2 | 1.4 | 15.5 | 20.4 | 20.4 | 17.7 |
| | x | 0.2517 | 0.3752 | 0.2564 | 0.2430 | 0.2428 | 0.2381 |
| | y | 0.5714 | 0.6039 | 0.5738 | 0.5555 | 0.5555 | 0.5487 |
| Passes D$_{6500}$ + Traffic Signal | | No | No | No | Yes | Yes | Yes |
| Oxide or Property | | D[e] | E[e] | 4 | 5 | 6 | |
| SiO$_2$ | | 56.70 | 54.20 | 55.65 | 56.15 | 56.05 | |
| B$_2$O$_3$ | | 1.43 | 1.43 | 1.43 | 1.43 | 1.43 | |
| Al$_2$O$_3$ | | 1.24 | 1.24 | 1.24 | 1.24 | 1.24 | |
| Li$_2$O | | 2.35 | 2.35 | 2.35 | 2.35 | 2.35 | |
| Na$_2$O | | 9.36 | 9.36 | 9.36 | 9.36 | 9.36 | |
| K$_2$O | | 2.36 | 2.36 | 2.36 | 2.36 | 2.36 | |
| TiO$_2$ | | 8.19 | 8.19 | 8.19 | 8.19 | 8.19 | |
| La$_2$O$_3$ | | 0.92 | 0.92 | 0.92 | 0.92 | 0.92 | |
| Nd$_2$O$_3$ | | 10.66 | 10.66 | 10.66 | 10.66 | 10.66 | |
| CeO$_2$ | | 2.36 | 2.36 | 2.36 | 2.36 | 2.36 | |
| Fe$_2$O$_3$ | | 2.00 | 4.50 | 3.05 | 2.55 | 2.65 | |
| CoO | | 0.0106 | 0.0106 | 0.0106 | 0.0106 | 0.0106 | |
| NiO | | 0.133 | 0.133 | 0.133 | 0.133 | 0.133 | |
| KHF$_2$ | | 1.88 | 1.88 | 1.88 | 1.88 | 1.88 | |
| NH$_4$Cl | | 0.40 | 0.40 | 0.40 | 0.40 | 0.40 | |
| % T$_{v,c}$ | | 24.2 | 10.4 | 18.2 | 23.8 | 22.5 | |
| a | | −0.51 | 9.03 | 1.30 | −0.03 | 0.38 | |
| b | | 19.89 | 19.91 | 21.06 | 21.23 | 21.27 | |
| % T @ 400 nm | | 1.2 | 0.0 | 0.2 | 0.7 | 0.5 | |
| 380 nm | | 0.0 | 0.0 | 0.0 | 0.0 | 0.0 | |
| D$_{6500}$ | | | | | | | |
| x | | 0.3943 | 0.4978 | 0.4244 | 0.4036 | 0.4085 | |
| y | | 0.4123 | 0.4436 | 0.4327 | 0.4194 | 0.4222 | |
| Traffic Signal @ 1.8 mm | | | | | | | |
| Red | T$_{sig}$ | 51.5 | 30.5 | 41.9 | 52.0 | 50.0 | |
| Yellow | T$_{sig}$ | 26.7 | 13.8 | 21.1 | 26.7 | 25.5 | |
| | x | 0.6100 | 0.6291 | 0.6134 | 0.6112 | 0.6121 | |
| | y | 0.3888 | 0.3699 | 0.3855 | 0.3876 | 0.3868 | |
| Green | T$_{sig}$ | 23.3 | 8.4 | 16.9 | 22.8 | 21.4 | |

-continued

| | Examples (All 1.8 mm thickness) | | | | |
|---|---|---|---|---|---|
| x | 0.2205 | 0.2793 | 0.2358 | 0.2246 | 0.2270 |
| y | 0.5112 | 0.6007 | 0.5446 | 0.5221 | 0.5273 |
| Passes $D_{6500}$ + Traffic Signal | Yes | No | Yes | Yes | Yes |

| Oxide or Property | 7 | 8 | F$^f$ | G$^f$ | 9 | 10 |
|---|---|---|---|---|---|---|
| $SiO_2$ | 56.00 | 55.45 | 58.01 | 4.01 | 58.70 | 57.51 |
| $B_2O_3$ | 1.43 | 1.43 | 1.43 | 1.43 | 1.43 | 1.43 |
| $Al_2O_3$ | 1.24 | 1.24 | 1.24 | 1.24 | 1.24 | 1.24 |
| $Li_2O$ | 2.35 | 2.35 | 2.35 | 2.35 | 2.35 | 2.35 |
| $Na_2O$ | 9.36 | 9.36 | 9.36 | 9.36 | 9.36 | 9.36 |
| $K_2O$ | 2.36 | 2.36 | 2.36 | 2.36 | 2.36 | 2.36 |
| $TiO_2$ | 8.19 | 8.19 | 8.19 | 8.19 | 4.19 | 8.19 |
| $La_2O_3$ | 0.92 | 0.92 | 0.92 | 0.92 | 0.92 | 0.92 |
| $Nd_2O_3$ | 10.66 | 10.66 | 10.66 | 10.66 | 10.66 | 10.66 |
| $CeO_2$ | 2.36 | 2.36 | 0.00 | 4.00 | 2.36 | 0.50 |
| $Fe_2O_3$ | 2.70 | 3.25 | 3.05 | 3.05 | 4.00 | 3.05 |
| CoO | 0.0106 | 0.0106 | 0.0106 | 0.0106 | 0.0106 | 0.0106 |
| NiO | 0.133 | 0.133 | 0.133 | 0.133 | 0.133 | 0.133 |
| $KHF_2$ | 1.88 | 1.88 | 1.88 | 1.88 | 1.88 | 1.88 |
| $NH_4Cl$ | 0.40 | 0.40 | 0.40 | 0.40 | 0.40 | 0.40 |
| % $T_{v,c}$ | 21.9 | 19.4 | 12.4 | 20.1 | 15.9 | 14.7 |
| a | 0.68 | 2.77 | 4.11 | 4.71 | 1.19 | 3.14 |
| b | 21.43 | 22.63 | 17.93 | 24.72 | 19.17 | 18.71 |
| % T @ 400 nm | 0.4 | 0.1 | 0.6 | 0.0 | 0.5 | 0.7 |
| 380 nm | 0.0 | 0.0 | 0.0 | 0.0 | 0.0 | 0.0 |
| $D_{6500}$ | | | | | | |
| x | 0.4120 | 0.4349 | 0.4412 | 0.4526 | 0.4206 | 0.4300 |
| y | 0.4243 | 0.4353 | 0.4288 | 0.4423 | 0.4293 | 0.4261 |
| Traffic Signal | | | | | | |
| Red $T_{sig}$ | 49.0 | 46.1 | 30.4 | 50.6 | 35.6 | 34.9 |
| Yellow $T_{sig}$ | 24.9 | 23.0 | 14.9 | 24.4 | 18.3 | 17.4 |
| x | 0.6123 | 0.6160 | 0.6190 | 0.6194 | 0.6133 | 0.6165 |
| y | 0.3865 | 0.3829 | 0.3799 | 0.3795 | 0.3855 | 0.3824 |
| Green $T_{sig}$ | 20.7 | 17.8 | 11.1 | 17.9 | 14.8 | 13.4 |
| x | 0.2288 | 0.2405 | 0.2450 | 0.2495 | 0.2340 | 0.2387 |
| y | 0.5302 | 0.5524 | 0.5498 | 0.5698 | 0.5409 | 0.5415 |
| Passes $D_{6500}$ + Traffic Signal | Yes | Yes | Yes | No | Yes | Yes |

| Oxide or Property | 11 | 12 | H$^g$ | I$^g$ | 13 | 14 |
|---|---|---|---|---|---|---|
| $SiO_2$ | 56.25 | 54.95 | 60.14 | 53.14 | 54.52 | 57.65 |
| $B_2O_3$ | 1.43 | 1.43 | 1.43 | 1.43 | 1.43 | 1.43 |
| $Al_2O_3$ | 1.24 | 1.24 | 1.24 | 1.24 | 1.24 | 1.24 |
| $Li_2O$ | 2.35 | 2.35 | 2.35 | 2.35 | 2.35 | 2.35 |
| $Na_2O$ | 9.36 | 9.36 | 9.36 | 9.36 | 9.36 | 9.36 |
| $K_2O$ | 2.36 | 2.36 | 2.36 | 2.36 | 2.36 | 2.36 |
| $TiO_2$ | 8.19 | 8.19 | 3.70 | 10.70 | 8.19 | 6.19 |
| $La_2O_3$ | 0.92 | 0.92 | 0.92 | 0.92 | 0.92 | 0.92 |
| $Nd_2O_3$ | 10.66 | 10.66 | 10.66 | 10.66 | 10.66 | 10.66 |
| $CeO_2$ | 1.66 | 3.06 | 2.36 | 2.36 | 3.49 | 2.36 |
| $Fe_2O_3$ | 3.05 | 3.05 | 3.05 | 3.05 | 3.05 | 3.05 |
| CoO | 0.0106 | 0.0106 | 0.0106 | 0.0106 | 0.0106 | 0.0106 |
| NiO | 0.133 | 0.133 | 0.133 | 0.133 | 0.133 | 0.133 |
| $KHF_2$ | 1.88 | 1.88 | 1.88 | 1.88 | 1.88 | 1.88 |
| $NH_4Cl$ | 0.40 | 0.40 | 0.40 | 0.40 | 0.40 | 0.40 |
| % $T_{v,c}$ | 17.7 | 21.1 | 23.3 | 16.0 | 21.0 | 22.7 |
| a | 2.54 | 2.48 | −1.26 | 6.76 | 3.29 | 0.00 |
| b | 20.82 | 23.60 | 16.47 | 23.20 | 24.31 | 20.17 |
| % T @ 400 nm | 0.3 | 0.1 | 4.1 | 0.0 | 0.0 | 1.1 |
| 380 nm | 0.0 | 0.0 | 0.2 | 0.0 | 0.0 | 0.0 |
| $D_{6500}$ | | | | | | |
| x | 0.4289 | 0.4334 | 0.3764 | 0.4701 | 0.4408 | 0.4006 |
| y | 0.4301 | 0.4360 | 0.3980 | 0.4437 | 0.4390 | 0.4164 |
| Traffic Signal | | | | | | |
| Red $T_{sig}$ | 41.6 | 50.2 | 46.7 | 42.9 | 51.1 | 48.9 |
| Yellow $T_{sig}$ | 20.8 | 24.9 | 25.1 | 20.2 | 25.1 | 25.4 |
| x | 0.6156 | 0.6158 | 0.6076 | 0.6229 | 0.6171 | 0.6109 |
| y | 0.3833 | 0.3830 | 0.3912 | 0.3761 | 0.3818 | 0.3879 |
| Green $T_{sig}$ | 16.3 | 19.5 | 22.9 | 13.8 | 19.2 | 21.7 |
| x | 0.2374 | 0.2391 | 0.2136 | 0.2605 | 0.2431 | 0.2236 |
| y | 0.5448 | 0.5525 | 0.4925 | 0.5816 | 0.5599 | 0.5183 |
| Passes $D_{6500}$ + Traffic Signal | Yes | Yes | Yes | No | Yes | Yes |

| Oxide or Property | 15 | 16 | 17 | 18 | 19 | 20 |
|---|---|---|---|---|---|---|
| $SiO_2$ | 56.65 | 54.65 | 54.15 | 56.15 | 54.57 | 53.07 |
| $B_2O_3$ | 1.43 | 1.43 | 1.43 | 1.43 | 1.43 | 1.43 |
| $Al_2O_3$ | 1.24 | 1.24 | 1.24 | 1.24 | 1.24 | 1.24 |
| $Li_2O$ | 2.35 | 2.35 | 2.35 | 2.35 | 2.35 | 2.35 |
| $Na_2O$ | 9.36 | 9.36 | 9.36 | 9.36 | 9.36 | 9.36 |
| $K_2O$ | 2.36 | 2.36 | 2.36 | 2.36 | 2.36 | 2.36 |
| $TiO_2$ | 7.19 | 9.19 | 10.19 | 8.19 | 8.19 | 8.19 |

-continued

| Examples (All 1.8 mm thickness) | | | | | | |
|---|---|---|---|---|---|---|
| $La_2O_3$ | 0.92 | 0.92 | 0.92 | 0.92 | — | — |
| $Nd_2O_3$ | 10.66 | 10.66 | 10.66 | 10.66 | 13.16 | 14.66 |
| $CeO_2$ | 2.36 | 2.36 | 2.36 | 2.36 | 2.36 | 2.36 |
| $Fe_2O_3$ | 3.05 | 3.05 | 2.55 | 2.55 | 2.55 | 2.55 |
| CoO | 0.0106 | 0.0106 | 0.0106 | 0.0106 | 0.0106 | 0.0106 |
| NiO | 0.133 | 0.133 | 0.133 | 0.133 | 0.133 | 0.133 |
| $KHF_2$ | 1.88 | 1.88 | 1.88 | 1.88 | 1.88 | 1.88 |
| $NH_4Cl$ | 0.40 | 0.40 | 0.40 | 0.40 | 0.40 | 0.40 |
| % $T_{v,c}$ | 19.9 | 18.7 | 19.7 | 23.8 | 18.5 | 19.1 |
| a | 0.21 | 3.41 | 3.33 | −0.03 | 3.44 | 3.85 |
| b | 20.27 | 22.94 | 23.29 | 21.23 | 21.15 | 21.18 |
| % T @ 400 nm | 0.5 | 0.0 | 0.1 | 0.7 | 0.2 | 0.2 |
| 380 nm | 0.0 | 0.0 | 0.0 | 0.0 | 0.0 | 0.0 |
| $D_{6500}$ | | | | | | |
| x | 0.4095 | 0.4419 | 0.4396 | 0.4036 | 0.4309 | 0.4298 |
| y | 0.4240 | 0.4383 | 0.4369 | 0.4194 | 0.4270 | 0.4238 |
| Traffic Signal | | | | | | |
| Red $T_{sig}$ | 44.1 | 45.7 | 48.0 | 52.0 | 45.6 | 48.1 |
| Yellow $T_{sig}$ | 22.6 | 22.4 | 23.6 | 26.7 | 22.0 | 22.8 |
| x | 0.6112 | 0.6172 | 0.6169 | 0.6112 | 0.6169 | 0.6170 |
| y | 0.3876 | 0.3817 | 0.3820 | 0.3876 | 0.3820 | 0.3819 |
| Green $T_{sig}$ | 18.9 | 17.0 | 18.0 | 22.8 | 16.9 | 17.4 |
| x | 0.2283 | 0.2441 | 0.2428 | 0.2246 | 0.2377 | 0.2373 |
| y | 0.5294 | 0.5594 | 0.5567 | 0.5221 | 0.5409 | 0.5349 |
| Passes $D_{6500}$ + Traffic Signal | Yes | Yes | Yes | Yes | Yes | Yes |

| Oxide or Property | 21 | 22 | 23 | 24 | 25 | 26 | 27 |
|---|---|---|---|---|---|---|---|
| $SiO_2$ | 55.72 | 57.95 | 55.65 | 55.34 | 55.31 | 55.45 | 56.49 |
| $B_2O_3$ | 1.43 | 1.43 | 1.43 | 1.43 | 1.43 | 1.43 | 1.43 |
| $Al_2O_3$ | 1.24 | 1.24 | 1.24 | 1.24 | 1.24 | 1.24 | 1.24 |
| $Li_2O$ | 2.35 | 2.35 | 2.35 | 2.35 | 2.35 | 2.35 | 2.35 |
| $Na_2O$ | 9.36 | 9.36 | 9.36 | 9.36 | 9.35 | 9.36 | 9.37 |
| $K_2O$ | 2.36 | 2.36 | 2.36 | 2.36 | 2.35 | 2.36 | 2.36 |
| $TiO_2$ | 8.19 | 6.19 | 8.19 | 8.19 | 8.18 | 8.19 | 7.21 |
| $La_2O_3$ | 0.92 | 0.92 | 0.92 | 0.92 | — | 0.92 | 6.09 |
| $Nd_2O_3$ | 10.66 | 10.66 | 10.66 | 10.66 | 10.64 | 10.66 | 5.34 |
| $CeO_2$ | 2.36 | 2.36 | 2.36 | 2.36 | 2.36 | 2.36 | 2.37 |
| $Fe_2O_3$ | 3.05 | 2.55 | 3.05 | 3.25 | 3.29 | 3.25 | 3.26 |
| CoO | 0.0106 | 0.0106 | 0.0053 | 0.0200 | 0.0106 | 0.0106 | 0.0106 |
| NiO | 0.067 | 0.331 | 0.133 | 0.133 | 0.133 | 0.133 | 0.180 |
| $KHF_2$ | 1.88 | 1.88 | 1.88 | 1.88 | 1.87 | 1.88 | 1.88 |
| $NH_4Cl$ | 0.40 | 0.40 | 0.40 | 0.40 | 0.40 | 0.40 | 0.40 |
| $Er_2O_3$ | — | — | — | — | 1.08 | — | — |
| % $T_{v,c}$ | 22.3 | 16.8 | 21.7 | 14.1 | 20.5 | 19.4 | 21.0 |
| a | 0.85 | 3.10 | 3.15 | 2.35 | 3.62 | 2.77 | 0.74 |
| b | 21.79 | 20.60 | 23.60 | 19.86 | 22.67 | 22.63 | 24.41 |
| % T @ 400 nm | 0.2 | 1.5 | 0.2 | 0.0 | 0.1 | 0.1 | 0.2 |
| 380 nm | 0.0 | 0.0 | 0.0 | 0.0 | 0.0 | 0.0 | 0.0 |
| $D_{6500}$ | | | | | | | |
| x | 0.4135 | 0.4328 | 0.4331 | 0.4390 | 0.4341 | 0.4349 | 0.4340 |
| y | 0.4248 | 0.4306 | 0.4325 | 0.4394 | 0.4296 | 0.4353 | 0.4466 |
| Traffic Signal | | | | | | | |
| Red $T_{sig}$ | 49.9 | 40.7 | 51.8 | 34.1 | 49.1 | 46.1 | 42.5 |
| Yellow $T_{sig}$ | 25.5 | 19.9 | 25.7 | 16.9 | 24.6 | 23.0 | 24.5 |
| x | 0.6122 | 0.6184 | 0.6169 | 0.6154 | 0.6152 | 0.6160 | 0.6090 |
| y | 0.3866 | 0.3804 | 0.3820 | 0.3834 | 0.3836 | 0.3829 | 0.3899 |
| Green $T_{sig}$ | 21.0 | 15.5 | 20.0 | 12.9 | 18.6 | 17.8 | 19.4 |
| x | 0.2301 | 0.2373 | 0.2384 | 0.2442 | 0.2417 | 0.2405 | 0.2469 |
| y | 0.5314 | 0.5488 | 0.5495 | 0.5595 | 0.5412 | 0.5524 | 0.5635 |
| Passes $D_{6500}$ + Traffic Signal | Yes | Yes | Yes | Yes | Yes | Yes | Yes |

[a]Example 22 of USP 5,190,896 — measured at 1.8 mm thickness
[b]Example 22 of '896 under reducing conditions (0.5 wt. % carbon added (Example B); 0.1 wt. % carbon added (Example C))
[c]Example 22 of '896 under neutral and oxidizing batch conditions (all carbonates used as batch ingredients (Example 1); nitrates used as batch ingredients (Example 2))
[d]Example 22 of '896 with cobalt present
[e]iron out of range
[f]cerium out of range
[g]titanium out of range

EXAMPLE 28

The amounts of $Fe^{+2}$ in glasses were determined colorimetrically utilizing a Ferrozine colorimetric method developed at Dupont for the determination of the ferrous-ferric ratio in glass containing nuclear waste. The samples were ground in an $Al_2O_3$ vial and dissolved in $HF$-$H_2SO_4$ containing $NH_4VO_3$ to preserve the Fe(II). After boric acid was added to complex the fluoride, the colored Fe(II)-Ferrozine complex was formed at pH 5 and the absorbance (A1) was measured at 562 nm on a Hitachi U-3210 spectrophotometer. The Fe(III) of the samples was then converted to Fe(II) by the addition of ascorbic acid and the total Fe(II) absorbance (A2) was measured. The Fe(II) percentage was calculated from these absorbance measurements as follows:

$A1/(A2-A1)*100 = \%\ Fe$  (II)

The values reported below are an average of three determinations.

| Example | % Fe(II) |
| --- | --- |
| Example 22 of USP 5,190,896 | 7.0 |
| Example 3 | 3.0 |
| Example 1 | 3.0 |
| Example B | 51.6 |
| Example C | 6.6 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A glass composition consisting essentially of:

| Oxide | Wt. % |
| --- | --- |
| $SiO_2$ | 40–72 |
| $B_2O_3$ | 0–13 |
| $Al_2O_3$ | 0.5–3 |
| $Li_2O$ | 0–3 |
| $Na_2O$ | 8–15 |
| $K_2O$ | 1–10 |
| $TiO_2$ | 4.2–10.2 |
| $CeO_2$ | 0.5–3.5 |
| $Nd_2O_3$ | 5.0–16.5 |
| $Fe_2O_3$ | 2.5–4.0 |
| CoO | 0.00–0.02 |
| NiO | 0.06–0.33 |
| ZnO | 0.0–7.0 |
| $Er_2O_3$ | 0–2 |
| $Cr_2O_3$ | 0.0–0.2 |
| $V_2O_5$ | 0.0–0.2 |
| CuO | 0.00–0.10 |
| $MnO_2$ | 0.0–2.0 |
| having the following properties: | |
| % $T_{v,c}$ (1.8 mm) | 14–30 |
| a | −0.1 to +6.0 |
| b | +18.0 to +26.0 |
| % T (380 nm; 1.8 mm) | 0.0 |
| % T (400 nm; 1.8 mm) | ≦1.5 | meeting the $D_{6500}$ (1.8 mm) and Traffic Signal (1.8 mm) specifications of ANSI Z80.3-1986, and wherein the amount of $Fe^{+2}$ in the glass is selected sufficiently low that said "a" and Traffic Signal properties are achieved.

2. A glass of claim 1 wherein said amount of $Fe^{+2}$ is less than 4.5% of the amount of iron in the glass.

3. A glass of claim 1 wherein said composition is:

| Oxide | Wt. % |
| --- | --- |
| $SiO_2$ | 45–65 |
| $B_2O_3$ | 0.5–5 |
| $Al_2O_3$ | 0.5–2.5 |
| $Li_2O$ | 0.0–2.7 |
| $Na_2O$ | 8.5–15.0 |
| $K_2O$ | 1.0–8.5 |
| $TiO_2$ | 5.2–9.2 |
| $CeO_2$ | 1–3 |
| $Nd_2O_3$ | 5.0–14 |
| $Fe_2O_3$ | 2.6–3.7 |
| CoO | 0.00–0.017 |
| NiO | 0.10–0.25 |
| ZnO | 0.0–6.5 |
| $Er_2O_3$ | 0.0–1.0 |
| $Cr_2O_3$ | 0.00–0.17 |
| $V_2O_5$ | 0.00–0.17 |
| CuO | 0.00–0.08 |
| $MnO_2$ | 0.0–1.8. |

4. A glass of claim 3 having the following properties:

| | |
| --- | --- |
| % $T_{v,c}$ (1.8 mm) | 14–25 |
| a | −0.1 to +5.5 |
| b | +18.5 to +25.5. |

5. A glass of claim 1 wherein said composition is:

| Oxide | Wt. % |
| --- | --- |
| $SiO_2$ | 48–60 |
| $B_2O_3$ | 0.5–2.5 |
| $Al_2O_3$ | 0.5–1.5 |
| $Li_2O$ | 0.0–2.4 |
| $Na_2O$ | 9–15 |
| $K_2O$ | 1.0–7.5 |
| $TiO_2$ | 6–9 |
| $CeO_2$ | 1.5–2.8 |
| $Nd_2O_3$ | 5.0–13.0 |
| $Fe_2O_3$ | 2.7–3.6 |
| CoO | 0.000–0.015 |
| NiO | 0.11–0.24 |
| ZnO | 0.0–6.0 |
| $Er_2O_3$ | 0.0–0.5 |
| $Cr_2O_3$ | 0.00–0.15 |
| $V_2O_5$ | 0.00–0.15 |
| CuO | 0.00–0.07 |
| $MnO_2$ | 0.0–1.4. |

6. A glass of claim 5 having the following properties:

| | |
| --- | --- |
| % $T_{v,c}$ (1.8 mm) | 15–24 |
| a | −0.1 to +4.5 |
| b | +19.0 to +25.0. |

7. A glass of claim 1 which has been melted under oxidizing conditions.

8. A glass of claim 1 which has at least one chem-strengthened surface.

9. A brown sunglass lens having low UV transmission consisting essentially of a glass of claim 1.

10. A sunglass combination comprising a sunglass frame and a sunglass lens of claim 9.

11. A glass composition consisting essentially of:

| Oxide | Wt. % |
| --- | --- |
| $SiO_2$ | 40–72 |
| $B_2O_3$ | 0–13 |
| $Al_2O_3$ | 0.5–3 |
| $Li_2O$ | 0–3 |
| $Na_2O$ | 8–15 |
| $K_2O$ | 1–10 |
| $TiO_2$ | 4.2–10.2 |
| $CeO_2$ | 0.5–3.5 |
| $Nd_2O_3$ | 5.0–16.5 |
| $Fe_2O_3$ | 2.5–4.0 |
| CoO | 0.0053–0.02 |
| NiO | 0.06–0.33 |
| ZnO | 0.0–7.0 |

-continued

| | |
|---|---|
| Er$_2$O$_3$ | 0–2 |
| Cr$_2$O$_3$ | 0.0–0.2 |
| V$_2$O$_5$ | 0.0–0.2 |
| CuO | 0.00–0.10 |
| MnO$_2$ | 0.0–2.0 |
| having the following properties: | |
| % T$_{v,c}$ (1.8 mm) | 14–30 |
| a | −0.1 to +6.0 |
| b | +18.0 to +26.0 |
| % T (380 nm; 1.8 mm) | 0.0 |
| % T (400 nm; 1.8 mm) | ≦1.5 | meeting the D$_{6500}$ (1.8 mm) and Traffic Signal (1.8 mm) specifications of ANSI Z80.3-1986.

12. A glass of claim 11 wherein the amount of Fe$^{+2}$ in the glass is selected sufficiently low that said "a" and Traffic Signal properties are achieved.

13. A glass of claim 11 wherein said composition is:

| Oxide | Wt. % |
|---|---|
| SiO$_2$ | 45–65 |
| B$_2$O$_3$ | 0.5–5 |
| Al$_2$O$_3$ | 0.5–2.5 |
| Li$_2$O | 0.0–2.7 |
| Na$_2$O | 8.5–15.0 |
| K$_2$O | 1.0–8.5 |
| TiO$_2$ | 5.2–9.2 |
| CeO$_2$ | 1–3 |
| Nd$_2$O$_3$ | 5.0–14 |
| Fe$_2$O$_3$ | 2.6–3.7 |
| CoO | 0.0053–0.017 |
| NiO | 0.10–0.25 |
| ZnO | 0.0–6.5 |
| Er$_2$O$_3$ | 0.0–1.0 |
| Cr$_2$O$_3$ | 0.00–0.17 |
| V$_2$O$_5$ | 0.00–0.17 |
| CuO | 0.00–0.08 |
| MnO$_2$ | 0.0–1.8 |

14. A glass of claim 13 having the following properties:

| | |
|---|---|
| % T$_{v,c}$ (1.8 mm) | 14–25 |
| a | −0.1 to +5.5 |
| b | +18.5 to +25.5 |

15. A glass of claim 11 wherein said composition is:

| Oxide | Wt. % |
|---|---|
| SiO$_2$ | 48–60 |
| B$_2$O$_3$ | 0.5–2.5 |
| Al$_2$O$_3$ | 0.5–1.5 |
| Li$_2$O | 0.0–2.4 |
| Na$_2$O | 9–15 |
| K$_2$O | 1.0–7.5 |
| TiO$_2$ | 6–9 |
| CeO$_2$ | 1.5–2.8 |
| Nd$_2$O$_3$ | 5.0–13.0 |
| Fe$_2$O$_3$ | 2.7–3.6 |
| CoO | 0.0053–0.015 |
| NiO | 0.11–0.24 |
| ZnO | 0.0–6.0 |
| Er$_2$O$_3$ | 0.0–0.5 |
| Cr$_2$O$_3$ | 0.00–0.15 |
| V$_2$O$_5$ | 0.00–0.15 |
| CuO | 0.00–0.07 |
| MnO$_2$ | 0.0–1.4 |

16. A glass of claim 15 having the following properties:

| | |
|---|---|
| % T$_{v,c}$ (1.8 mm) | 15–24 |
| a | −0.1 to +4.5 |
| b | +19.0 to +25.0 |

17. A glass of claim 11 which has at least one chem-strengthened surface.

18. A brown sunglass lens having low UV transmission consisting essentially of a glass of claim 11.

19. A sunglass combination comprising a sunglass frame and a sunglass lens of claim 18.

20. A glass of claim 1 wherein the amount of Fe$_2$O$_3$ is at least 2.8 wt. %.

21. A glass of claim 11 wherein the amount of Fe$_2$O$_3$ is at least 2.8 wt. %.

22. A glass of claim 1 wherein said amount of Fe$^{+2}$ is less than 3% of the amount of iron in the glass.

23. A glass of claim 1 coated with an antireflection coating.

24. A glass of claim 11 coated with an antireflection coating.

25. A glass of claim 1, further comprising La$_2$O$_3$ in an amount up to 11.5 wt. %.

* * * * *